(12) United States Patent
Ngoo et al.

(10) Patent No.: US 10,541,891 B2
(45) Date of Patent: *Jan. 21, 2020

(54) NETWORK CONFIGURATION PREDICTIVE ANALYTICS ENGINE

(71) Applicant: International Business Machines Corporation, Armonk, NY (US)

(72) Inventors: Yik Shaw Ngoo, Kuala Lumpur (MY); HeeThong How, Petaling Jaya (MY)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/787,330

(22) Filed: Oct. 18, 2017

(65) Prior Publication Data

US 2018/0041400 A1 Feb. 8, 2018

Related U.S. Application Data (63) Continuation of application No. 13/458,259, filed on Apr. 27, 2012, now Pat. No. 9,923,787.

(51) Int. Cl.
| | |
|---|---|
| *H04L 12/26* | (2006.01) |
| *H04L 12/24* | (2006.01) |
| *H04L 12/759* | (2013.01) |
| *H04L 12/751* | (2013.01) |

(52) U.S. Cl.
CPC .......... *H04L 43/04* (2013.01); *H04L 41/0645* (2013.01); *H04L 41/0681* (2013.01); *H04L 41/0853* (2013.01); *H04L 41/0873* (2013.01); *H04L 41/12* (2013.01); *H04L 41/147* (2013.01); *H04L 43/065* (2013.01); *H04L 41/0654* (2013.01); *H04L 43/00* (2013.01); *H04L 45/02* (2013.01); *H04L 45/028* (2013.01)

(58) Field of Classification Search
CPC ....... H04L 43/04; H04L 43/065; H04L 43/00; H04L 41/0645; H04L 41/0681; H04L 41/0853; H04L 41/0873; H04L 41/12; H04L 41/147; H04L 41/0654; H04L 45/02; H04L 45/028
See application file for complete search history.

(56) References Cited

U.S. PATENT DOCUMENTS

| | | |
|---|---|---|
| 8,010,952 B2 | 8/2011 | Datla et al. |
| 8,594,061 B2 | 11/2013 | Kennedy et al. |
| 8,849,965 B2 | 9/2014 | Gonia |
| 8,965,392 B2 | 2/2015 | Backholm et al. |

(Continued)

*Primary Examiner* — Viet D Vu
(74) *Attorney, Agent, or Firm* — Alexander Jochym; Jeffrey S. LaBaw; David H. Judson (57) ABSTRACT

A mechanism associated with a network management system (NMS) interprets and predicts the impact on a network of a network configuration change proactively. By providing pre-configuration analysis in this manner, a network administrator can determine the potential effect of the proposed configuration change in advance of actually inserting a configuration command in the network that might otherwise have unforeseen and damaging consequences. The technique is implemented using a predictive analytics engine that receives a proposed network command and, using a current network topology, executes the command against one or more NMS algorithms to verify that the command can be implemented safely.

7 Claims, 4 Drawing Sheets

(56) References Cited

U.S. PATENT DOCUMENTS

| | | |
|---|---|---|
| 9,042,251 B2 | 5/2015 | Berg et al. |
| 2006/0072592 A1* | 4/2006 | Graves .................... H04L 45/02 370/401 |
| 2008/0172716 A1 | 7/2008 | Talpede et al. |
| 2010/0292857 A1 | 11/2010 | Bose et al. |
| 2010/0325496 A1* | 12/2010 | Kumar ................ H04L 41/0806 714/57 |
| 2011/0004914 A1 | 1/2011 | Ennis, Jr. et al. |

* cited by examiner

1) ALARM POP UP
2) ROOT CAUSE ANALYSIS
3) AUTOMATIC RECOVERY PROCESS

NETWORK CONFIGURATION PREDICTIVE ANALYTICS ENGINE

BACKGROUND OF THE INVENTION

Technical Field

This disclosure relates generally to network management tools.

Background of the Related Art

Maintaining the proper operation of various types of computerized services is usually an important but difficult task. Service administrators are often called upon to react to a service failure by identifying the problem which caused the failure and then taking steps to correct the problem. To avoid wasting resources investigating the wrong problems, administrators must make accurate assessments as to the causes of failures. Because substantial time and resources are often required, administrators must also make accurate decisions as to when to allocate resources to the tasks of identifying problems and fixing them.

A number of network management tools are available to assist administrators in completing these tasks. Network management systems discover, model and maintain knowledge bases of network devices and their connectivity, and provide mechanisms to actively monitor the network proactively to identify network problems. IBM® Tivoli® Netcool® is a suite of applications that allow network administrators to monitor activity on networks, to log and collect network events, including network occurrences such as alerts, alarms, or other faults, and then report them to network administrators in graphical and text-based formats. Using such tools, administrators are able to observe network events on a real-time basis and respond to them more quickly. Such systems also typically include network service monitors of various types which measure performance of a network so that, among other things, network resources can be shifted as needed to cover outages. A system of this type may also include a configuration management tool to automate network configuration and change management tasks. This enables network operators and administrators to enhance network security by controlling access by users, devices and commands, maintain the real-time state of the network, and automate routine configuration management tasks.

While these tools provide significant advantages, fault management occurs after-the-fact, i.e., after the issue or incident has already occurred and for the purpose of minimizing the damage already done. Indeed, root cause analysis, although sophisticated, is designed to drive recovery automation and related approval processes before corrective commands are inserted into the affected network element (e.g., a router or switch). The problem with this approach is that the corrective action itself may cause new problems. For example, a network management tool may suggest a corrective course of action, such as instructing a network engineer to open a port when the result of that action causes a broadcast packet storm that then floods the network with packets and interrupts other services. When the corrective action itself causes new issues, further operational costs and network downtime often result.

There remains a need in the art to provide new techniques for network management that addresses these and other deficiencies in the known art.

BRIEF SUMMARY

This disclosure describes a technique and system to provide a predictive mechanism that interprets and predicts the impact on the network of a network configuration change proactively, preferably based on one or more of: an awareness of the network topology, configuration command history, and network analytics. By providing pre-configuration analysis in this manner, a network administrator can determine the potential effect of the proposed configuration change in advance of actually inserting a configuration command in the network that might otherwise have unforeseen and damaging consequences. In a representative embodiment, a predictive analytics engine (PAE) receives and stores a current network status. That status is updated periodically and continuously such that a current view of the network topology is available to the engine. Following a network incident, a proposed configuration command is entered in the predictive analytics engine and an analysis executed. If, based on the analysis, the engine determines that the configuration command may be executed safely, an indication to this effect is provided and/or the command is issued to the affected device or system. The predictive analytics engine then receives an update from the network device and validates that the correction (as represented by the configuration command) was successful. If, however, based on the analysis the engine determines that the configuration command may not be executed safely, the engine alerts the administrator and/or makes a recommendation about an alternative course of action to address the incident.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
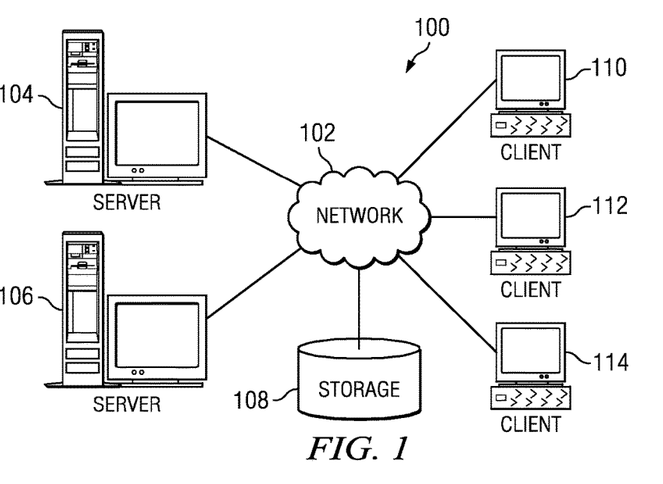
FIG. 1 depicts an exemplary block diagram of a distributed data processing environment in which exemplary aspects of the illustrative embodiments may be implemented.
Figure 2:
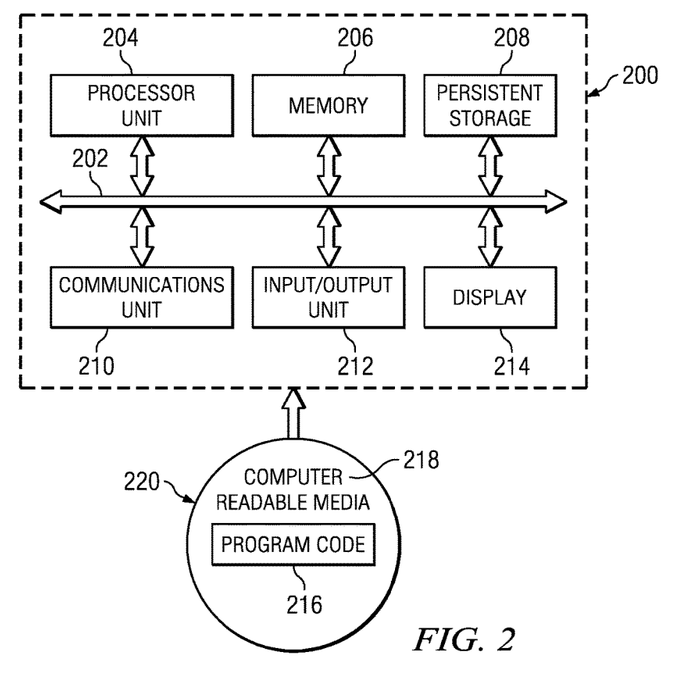
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212.

The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. In such an approach, end users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In the alternative, the techniques described herein may operate within a standalone data processing system, or within the context of a "cloud" environment wherein computing resources are shared among a number of entities.

Network Management

Figure 3:
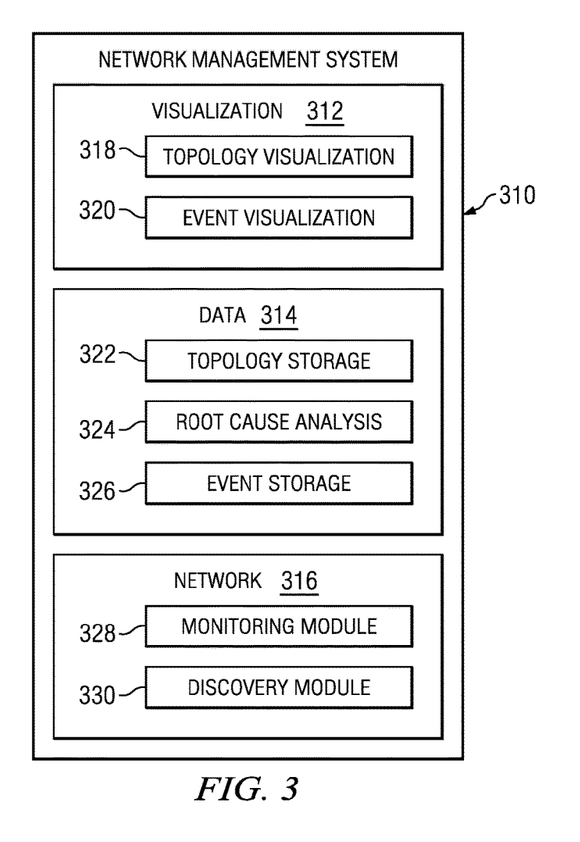
FIG. 3 illustrates a known network management system.

Referring now to FIG. 3, a conceptual view of a network management system 300 is illustrated. Without meant to be limiting, each of the components shown in this drawing may be implemented in one or more machines, systems, devices, programs, processes, execution threads, and the like. Typically, a machine is a data processing system such as shown in FIG. 2, and the identified functionality is implemented in one or more software routines executed on hardware elements. One or more of the components may be remotely-located from one another, and components may be offered as a service in a SaaS-based or other cloud-compute delivery model.

The network management system 300 generally comprises a visualization layer 312, a data layer 314, and a network layer 316. The visualization layer 312 typically provides topology visualization 318 and event visualization 320. Using topology visualization 318, network operators may use a number of topology visualization GUIs to view the network and to drill into network devices. Topology maps may be fully customized to show specific devices, or to show specific device groupings, such as subnets and virtual LANs ("VLANs"). Operators may switch from topology views to alert views to see alert details for affected devices. They may also have access to diagnostic tools, such as topology browsers, which may obtain IP data for any device. Using event visualization 320, operators may view alert lists and use alert severity ratings to quickly identify high priority device alerts. They may switch from alert views to topology views to see which devices are affected by specific alerts. They may also identify root-cause alerts and list the symptom alerts that may contribute to the root cause. Alerts may be generated by a network manager monitoring mechanism, or they may be received from other network management systems or mechanisms.

The data layer 314 typically includes topology storage 322, root-cause analysis (RCA) 324, and event storage 326. Topology storage 322 may include a topology database, also known as a Network Connectivity and Inventory Model ("NCIM"). This topology database may include a relational database to consolidate topology data from other devices and system. Root-cause analysis 324 is used to determine the root cause of one or more device alerts. A failure situation on the network may generate multiple alerts. This is because a failure condition on one device may render other devices inaccessible. Alerts may be generated to indicate that all of these devices are inaccessible. The network management system may perform root cause analysis by correlating event information with topology information to determine which devices are temporarily inaccessible due to other network failures. Alerts on devices which are temporarily inaccessible may be suppressed or shown as symptoms of the original root-cause alert. Root-cause alerts also may be shown in alert lists and topology maps with identified severity levels so that operators can easily identify them. Event and alert data are stored in event storage device 326.

The network layer 316 typically includes a monitoring module 328 and a discovery module 330. The monitoring module 328 enables network administrators to configure polling of discovered network devices. Such polls may indicate whether a network device is up or down, whether it has exceeded key performance parameters, and/or whether links between devices may be faulty. If a poll fails, the network management system 310 may generate a device alert, which operators may view in alert lists. The discovery module 330 enables network administrators to generate a network topology. This topology typically is stored in the topology database 322, and it may be visualized by network operators as topology maps. Such topology maps may be customized to show specific devices or specific device groupings, such as subnets and VLANs. In operation, the discovery module 330 collects raw IP data to detect existence of a device on the network, and it may query the device for further inventory and connectivity information. The module 320 processes the raw IP data, inventory and connectivity information to generate a topology model.

A representative network management system is available commercially as IBM® Tivoli® Network Manager™ IP Edition. As described above, this system actively monitors the network to identify and potentially address network problems. The system may include a web-enabled or other administrative/management interface to enable monitoring and viewing of management data, a policy engine to configure and manage policies to be applied with respect to the network or particular network devices, a performance management tool to collect performance data and generate reports, a configuration manager to automate network configuration and change management tasks, control over network device access and network policy compliance, and a flow-based network traffic analysis system that provides a detailed view of resource usage in networked IT infrastructures.

Figure 4:
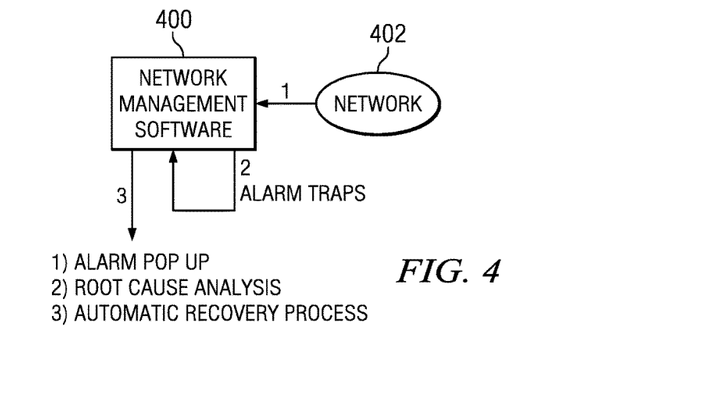
FIG. 4 illustrates how the network management system in FIG. 3 responds to an alarm to generate a root cause analysis and an automated recovery process.

FIG. 4 illustrates a typical model for post-incident assessment and correction according to the prior art. In this approach, the network management system 400 includes the components shown in FIG. 3. In response to an alarm (step 1) from the network 402, the network management system 400 traps the alarm and performs root cause analysis (step 2). The network management system then performs an automatic or automated recovery process (step 3) to attempt to address the problem that generated the alarm. In this approach, as has been described, a corrective action (e.g., updating a router or switch with a new configuration) may then be undertaken. The effect of the correction, however, may address the problem that caused the alarm; however, the correction also may have other unintended consequences on the network or various devices thereon.

Network Configuration Predictive Analysis Engine

With the above background, the subject matter of this disclosure describes a predictive approach to network management that enables an administrator to formulate a proposed corrective action in response to a network event, and to analyze an impact of that action on the network before deploying that action. Unlike the post-configuration analysis approach of the prior art, the disclosed technique provide for pre-configuration analysis to ensure that proposed configuration changes do not create new problems. In a particular embodiment, the technique provides an administrator the ability to predict or interpret the response of a network device prior to inserting a configuration command into that device. The pre-configuration analysis approach of this disclosure may be used in any network management system, and with respect to any network device, system, program or process.

To this end, the described operation is provided in a network configuration predictive analysis engine (PAE). This nomenclature is merely for purposes of explanation and should not be taken as limiting. Without limitation, the predictive analysis engine is implemented in computer software executing on one or more processors or processing devices. Depending on implementation, the computer software typically comprises one or more computer programs, one or more processes, one or more execution threads, etc., and associated data and data structures. The programs and data are held in computer memory.

Figure 5:
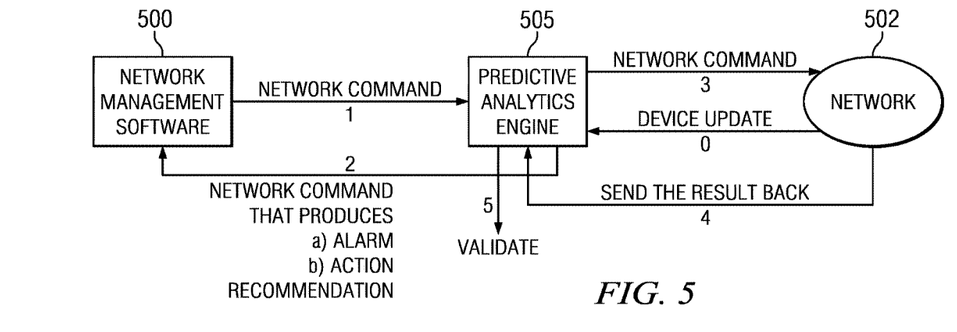
FIG. 5 depicts a block diagram of predictive network management approach according to this disclosure.

FIG. 5 illustrates a representative operation of the network configuration predictive analytics engine 505, which is positioned between network management system 500 and the network 502 that is being managed by that system. Although the drawing illustrates the predictive analytics engine 505 as being distinct from the network management system 500, this is not a limitation, as the engine may be integrated with or otherwise a component of the network management system. In the alternative, the engine may be operated as a distinct and separate operating component, and may be either co-located or remote from the network management system and/or the network itself. In this operation, at step 0, the engine 505 receives update information from one or more network devices. Typically, the update information includes, without limitation, configuration status, routing table data, operational status, and the like). In a preferred embodiment, the engine 505 receives the update information extracted from the configuration as a result of a programmatic command line interface (CLI) query to the device. In the alternative, the device pushes its configuration data to the engine on a periodic basis, or asynchronously. Based on the received configuration data, the engine 505 builds a topology of the network (or a given portion of the network) at the time of the update. Preferably, the updates are received at (or otherwise provided to) the engine periodically and continuously so that the engine has a substantially real-time "view" of the network topology.

In this manner, the predictive analytics engine (or one or more components thereof) discover, model and maintain a knowledgebase of the network (and the various devices thereof) and, in particular, its topology and operational state.

Referring back to FIG. 5, at step 1, it is assumed that the network management system has received an alert or alarm indicative of a network event that needs to be addressed. As noted above, network management systems actively monitor the network to respond to network problems, e.g., by issuing alarms, providing root cause analysis and visualizations, performing automated recovery, and the like. The network management system thus is adapted and/or configured to manually or in automated manner generate a network command. The network command or, more generally, the configuration command, typically provides control signaling and related data to address a particular problem or type of problem that has been found (by the network management system) to have triggered the alert or alarm. The nature of the command will vary depending on the implementation but also on the type of problem that has been assessed by the network management system. Thus, for example, an alarm may indicate that a network switch is looping after a particular network interface is activated; the recommended action is such case may be to check whether a given service (STP) is enabled on the affected port. The network management system may then recommend that the network engineer issue a "no shut" command to address the issue. In another example, an address conflict alarm may be raised indicating that the network has been identified by an unknown router; in such case, the network management system may recommend checking the network against existing router tables. The network management system may then recommend that the network engineer issue an OSPF command to the router. Of course, these are just representative examples.

Referring back to FIG. 5, the predictive analytics engine receives the proposed network command and performs an analysis. The predictive analytics engine in effect "executes" the command internally and determines the effect or impact of such execution. In this manner, the engine simulates how the network will respond to the network command given its current topology and operating state. Without intending to be limiting, preferably the analytics engine performs this simulation based on one of more of the following data or data types: awareness of the network topology, configuration command history, and network analytics. As a result of executing the network command (preferably within the engine itself), the engine determines an outcome. If the engine determines that the network command is likely to (or will) cause a new network event (e.g., an incident, an alarm, or the like), the engine returns an indication to this effect back to the network management system. The nature of this indication will depend on the implementation, and it may be provided programmatically or other means, such as e-mail, text message, web page updates, or the like. In general, the engine flags the potential new network event and may also provide the network management system with an action or recommendation. The action or recommendation will depend on the implementation and the scope and nature of the potential problem that has been identified by the analytics engine. The decision to return an alarm or recommendation back to the network management system may be based on a configurable threshold of severity, or based on other factors, such as time-of-day, identification of the network device expected to be affected, device location, data potentially impacted, or the like. If, on the other hand, the engine determines (based on the simulation) that the network command is valid (or likely valid), e.g., based on a configurable threshold of validity, the engine provides the network command to the network device. This is step 3. At step 4, the network device receives an update from the network device. This information is then validated at step 5 and, if valid, applied to the existing state information stored by the engine.

Figure 6:
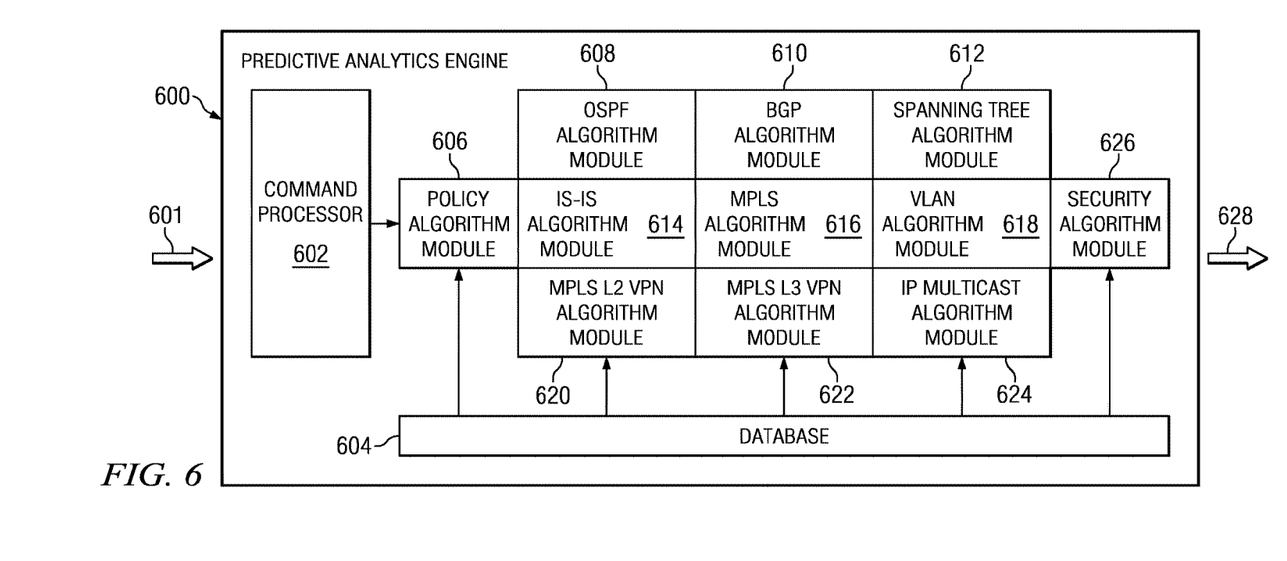
FIG. 6 depicts a block diagram of the predictive analytics engine in one embodiment.

FIG. 6 illustrates a representative predictive analytics engine 600. Although the engine is illustrated with distinct components, one of ordinary skill in the art will appreciate that this component-based or module-based is not meant to be limiting. One or more of the components shown in the drawing may be combined, and one or more components may be executed remotely from one another. As noted above, the engine 600 stores the current network status, preferably in a database 604 that is shared by the components. Preferably, the engine has the full topology of the network (or, at the very least, that portion of the network that is to be analyzed) extracted from the configuration and in response to a CLI query to the device. As noted above, this data in the alternative may be pushed from the network device to the engine. The particular mechanism by which such configuration data is supplied is not limited, although preferably the data is refreshed frequently, such as hourly or daily. Frequent update of the state data ensures that the network status is up-to-date to avoid lack of integrity issues.

The main processing components of the engine comprise a command processor 602, a policy algorithm module 606, a set of individual NMS algorithm modules 608-624, and a security algorithm module 626. Each component comprises its own algorithm to process the incoming command and output any necessary warning or action recommendation. The command 601 is received by the engine and routed by the command processor 602 to one or more of the algorithm modules, depending on the type and scope of the command. One network command may be passed to more than one network algorithm module. The modules use the database 604 as their base to perform the required analysis. The database includes network topology information, as well as the data required by each particular module for its processing. Thus, more generally, the database 604 is a knowledge database (or knowledgebase). The policy algorithm module 606 and the security algorithm module 626 are provided as needed to ensure that the command is both compliant with one or more security policies and/or constraints. The remaining algorithms provide context-specific NMS operations; as noted above, whether a particular module is implicated depends on the network command. Thus, in many cases only one or several of the modules will be implicated by the network command and executed to determine whether the network command will impact the network. Thus, module 608 checks to determine whether a command directed to change a router configuration is OSPF compliant. Module 610 checks for BGP compliance. Module 612 verifies the network command against a spanning tree algorithm to determine potential effects of implementing the command against the current network topology. In like manner and, as necessary, module 614 verifies the command complies with respect to IS-IS protocol issues, while module 616 verifies the command with respect to multiprotocol label switching (MPLS). Module 618 checks to determine the impact of the command on current virtual LAN (VLAN) configurations. Module 620 checks for MPLS Layer 2 VPN compliance, while module 622 checks for MPLS Layer 3 VPN compliance. The IP multicast algorithm module 624 checks to verify whether any applicable network command executes correctly with respect to any such algorithm that might be implicated by the command.

The particular NMS algorithms identified in FIG. 6 are known, and other NMS algorithms and processes may be substituted or may augment/supplement those that are shown in the example engine 600. Of course, the particular NMS functions to be analyzed against the network command 601 may be quite varied and will depend on the nature of the analysis sought to be carried out proactively according to the techniques herein. As a result of applying the analysis, an output 628 is generated. As previously described, this output may simply be the network command being passed to the network or network device. This is a default operation when the result(s) of executing the network command indicate that the command can be executed safely or validly (typically within some margin of configurable error). If, however, one or more of the modules indicates the possibility of a new problem (as a result of executing the command 601), the output 628 may be an alarm, an alarm together with a recommended change to the command, or just a recommendation. The output 628 may be provided in a machine-readable format and is then communicated back to the network management system.

The above-described operation of the predictive analytics engine helps to detect issues before the command is injected into the network (and applied to individual network devices thereon). Because the network command is analyzed within a particular context (i.e., by the specific algorithm that may be affected), the analysis provides a logical and useful result, typically in the form of a warning and/or recommendation that are then acted upon (either manually or programmatically). The output 628 also may be provided (e.g., to the network engineer or others) visually and/or aurally.

Generalizing, one or more components or functions of the predictive analytics engine is implemented in computer software executing on one or more processors or processing devices. Depending on implementation, the computer software typically comprises one or more computer programs, one or more processes, one or more execution threads, etc., and associated data and data structures. The programs and data are held in computer memory.

Figure 7:
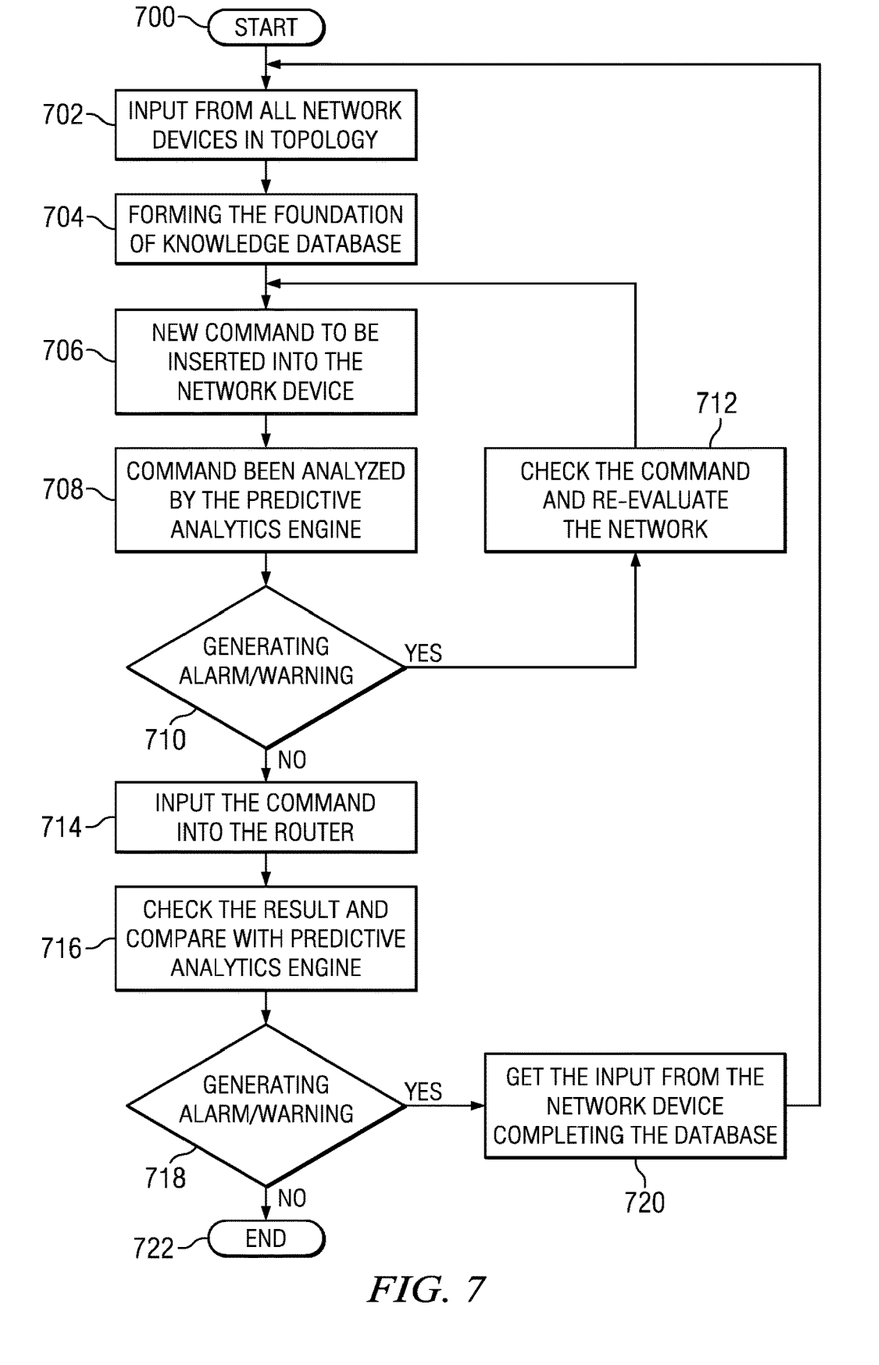
FIG. 7 depicts a process flow of the predictive network management approach of this disclosure.

FIG. 7 is a process flow illustrating the operation of the engine in more detail. The routine begins at step 700. At step 702, input(s) from one or more (and preferably all) network devices in the topology are collected. Although not meant to be limiting, data is retrieved via a request/response query initiated from the engine (or NMS), or data is pushed to the engine (or NMS) from the network device. At step 704, the analytics engine generates a knowledgebase that includes the then-current topology and related information describing the network configuration. The knowledgebase also may include other data, such as historical configuration data, historical incident data, configuration command history, details regarding how each module (in FIG. 6) performs prediction calculations, and other network or performance analytics and data. During step 704, which may be continuous, the engine builds its active knowledge of the network topology. At step 706, a new command is received by the analytics engine. The command is then analyzed by the engine at step 708; as described above, this operation triggers execution of one or more processing modules (each preferably analyzing a particular algorithm). At step 710, a test is performed to determine whether the analysis generated an alarm. If so, the routine branches to step 712 to check the command. The result of step 712 may be that the command is discarded, amended, supplemented or otherwise augmented to address the alarm/warning issued in step 710. If the result of the test at step 710 indicates that the network command (perhaps as modified via the loop through step 712) is valid (or safe), the routine continues at step 714. At this step the engine inputs the command into one or more network devices (such as a router or switch). The routine then continues at step 716 to check the result of applying/executing the command against the one or more network devices. Thus, another test is performed at step 718 to determine whether the network command has triggered or raised any new alarm or warning. If so, the routine branches to step 720. At step 720, input from the network device is obtained and supplied back to the knowledgebase. This input typically will reflect a fault or failure condition. If, however, the result of the test at step 718 indicates no alarm or warning, the routine ends at step 722.

The following are representative use cases. These use cases should not be taken to limit this disclosure. In a first use case, an alarm indicates that a switch is looping after an interface (e.g., Gigabit Ethernet 3/1) is activated. A recommended action (provided by the NMS) is to check whether STP is enabled on the port. Without the PAE, the network engineer might simply issue a command such as "no shut," but that command may result in a broadcast store in the network, wherein the network would then be flooded with packets and services are interrupted. To avoid that outcome, the network command is first verified through a spanning tree algorithm (by module 612) before being injected into the impacted switch. In a second use case, the alarm is an address conflict and the recommended corrective action is a router configuration change, such as "network 10.1.1.0 1 0.0.0.255." Before that command is issued, however, the PAE engages its OSPF algorithm module for analysis action and verification. In each case, after the analysis, the PAE will output an alarm, or an alarm and recommendation, or allow the network command to execute against the network, as has been previously described.

The disclosed subject matter provides significant advantages. A major advantage is that the described approach interprets and predicts the impact of network configuration commands proactively. This approach obviates most post-configuration analysis because it affords the network manager an opportunity to modify a network command before that command is actually used based on real-world impact on the then-current network topology and state. It enables the user to anticipate possible issues that might arise due to incorrect or inappropriate network configuration commands being entered by the network management system. By using the technique, network operational costs are significantly reduced, as the analytics engine preferably only releases the network command if that command can be executed safely. As a consequence, further network issues or downtime (that might arise as a result of the original fix) are avoided. In operation, the analytics engine preferably checks every network command for its validity, and it raises an appropriate alarm/warning for an operation if the command is anticipated to cause other network issues.

Many variants are within the scope of this disclosure. Thus, for example, there may be multiple analytics engines providing the service(s) described herein, e.g., in a cloud-compute environment. An NMS may use a third party predictive analytics engine. The output of the engine may be logged and used for other management, compliance, auditing or reporting purposes.

As noted, the functionality described above may be implemented as a standalone approach, e.g., a software-based function executed by a processor, or it may be available as a managed service (including as a web service via a REST or SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the described functions may be hosted within or external to the cloud.

Still more generally, the subject matter described herein can take the form of an entirely hardware embodiment, an entirely software embodiment or an embodiment containing both hardware and software elements. In a preferred embodiment, the workflow recording and playback functions are implemented in software, which includes but is not limited to firmware, resident software, microcode, and the like. The data can be configured into a data structure (e.g., an array, a linked list, etc.) and stored in a data store, such as computer memory. Furthermore, as noted above, the recording and playback functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the predictive analytics engine components are implemented in a special purpose computer, preferably in software executed by one or more processors. The associated knowledgebase is stored in an associated data store. The software also is maintained in one or more data stores or memories associated with the one or more processors, and the software may be implemented as one or more computer programs.

The analytics function referenced herein may be implemented as an adjunct or extension to an existing network management system, access manager or policy management solution. The described functionality may comprise a component of an NMS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

Having described our invention, what we now claim is as follows:

1. A method of network management in association with a network management system, comprising:
   generating and maintaining a substantially real-time view of a network topology by continuously receiving status updates from network devices in a network being managed, at least one status update received in response to a programmatic command line interface query to a given one of the network devices;
   receiving a corrective command, the corrective command having been automatically generated by the network management system in response to a fault occurrence in the network and that is proposed by the network management system to address the fault occurrence;
   selecting an algorithm from a set of algorithms associated with network management system (NMS) functions, each of the algorithms providing a distinct context-specific NMS operation, and wherein the algorithm selected is determined based on a type of the fault occurrence and the corrective command that has been generated; and
   analyzing, using the algorithm so selected, the corrective command so received against the substantially real-time view of the network topology prior to the corrective command being deployed to address the fault occurrence to simulate a network response to executing the corrective command in the network;
   wherein the analyzing step is carried out at least in part in a hardware element.

2. The method as described in claim 1 wherein the status updates are received one of: periodically, and asynchronously.

3. The method as described in claim 1 wherein the corrective command is a network configuration command that is generated in response to an alarm in the network.

4. The method as described in claim 1 further including generating an alarm when the network response that is simulated is a subsequent incident.

5. The method as described in claim 1 further including passing the corrective command to the network when the network response that is simulated is that the corrective command will execute successfully.

6. The method as described in claim 5 wherein the corrective command is passed to the network when the network response that is simulated exceeds a configurable threshold of validity.

7. The method as described in claim 1 wherein, in addition to the network topology, the corrective command also is analyzed against one of: a command history, and data indicative of a network operating state.

* * * * *